United States Patent
Jung et al.

(10) Patent No.: US 8,879,990 B2
(45) Date of Patent: Nov. 4, 2014

(54) METHOD AND APPARATUS FOR AUTOMATICALLY CONNECTING SHORT RANGE WIRELESS NETWORK IN PORTABLE TERMINAL

(75) Inventors: Ji-Woon Jung, Yongin-si (KR); Won-Chang Jang, Seoul (KR); Hyo-Sun Shim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 552 days.

(21) Appl. No.: 13/005,329

(22) Filed: Jan. 12, 2011

(65) Prior Publication Data

US 2011/0171909 A1  Jul. 14, 2011

(30) Foreign Application Priority Data

Jan. 12, 2010  (KR) ........................ 10-2010-0002561

(51) Int. Cl.
| | | |
|---|---|---|
| *H04B 7/00* | (2006.01) | |
| *H04W 48/16* | (2009.01) | |
| *H04W 64/00* | (2009.01) | |
| *H04W 52/02* | (2009.01) | |
| *H04W 60/00* | (2009.01) | |
| *H04W 84/10* | (2009.01) | |
| *H04W 4/02* | (2009.01) | |

(52) U.S. Cl.
CPC .............. *H04W 48/16* (2013.01); *H04W 64/00* (2013.01); *H04W 52/0254* (2013.01); *H04W 60/00* (2013.01); *H04W 84/10* (2013.01); *H04W 4/02* (2013.01)
USPC ...................... 455/41.2; 340/539.11; 235/280

(58) Field of Classification Search
CPC ....... H04W 4/023; H04W 4/025; H04W 4/02; H04W 12/06; H04W 48/16; H04W 52/0254; H04W 88/02; H04W 88/08; H04W 4/027
USPC ............. 455/41.2, 456.1, 456.2, 404.2, 435.1
See application file for complete search history.

(56) References Cited

U.S. PATENT DOCUMENTS 6,480,716 B2 * 11/2002 Salonaho ....................... 455/441
6,495,667 B1 * 12/2002 Bazan .......................... 530/389.2
7,039,364 B2 *  5/2006 Majaniemi ................... 455/67.11

(Continued)

FOREIGN PATENT DOCUMENTS

| CA | 2744847 | 5/2007 |
| CN | 101248626 | 8/2008 |

(Continued)

OTHER PUBLICATIONS

International Search Report dated Sep. 23, 2011 in connection with PCT Patent Application No. PCT/KR2011/000210.

(Continued)

*Primary Examiner* — Marceau Milord (57) ABSTRACT

A method and an apparatus for automatically connecting a short range wireless network in a portable terminal. The method for automatically connecting a short range wireless network in the portable terminal includes, when registering to an Access Point (AP), storing location information of the AP. The method also includes obtaining location information of the terminal. The method further includes controlling an activation cycle of a communication module by comparing the location information of the terminal and the location information of the AP. The method still further includes, when the communication module is activated, searching for the AP.

20 Claims, 7 Drawing Sheets

(56) References Cited

U.S. PATENT DOCUMENTS

| | | | |
|---|---|---|---|
| 7,072,654 B2* | 7/2006 | Fujiwara et al. | 455/435.1 |
| 7,286,802 B2* | 10/2007 | Beyme et al. | 455/67.14 |
| 7,321,575 B2* | 1/2008 | Mizugaki et al. | 370/328 |
| 7,544,443 B2* | 6/2009 | Fujihara et al. | 429/231.95 |
| 7,783,423 B2* | 8/2010 | Verma et al. | 701/469 |
| 8,060,582 B2* | 11/2011 | Bliss et al. | 709/218 |
| 8,229,465 B2* | 7/2012 | Rekimoto | 455/456.1 |
| 8,244,227 B2* | 8/2012 | Suzuki | 455/414.2 |
| 8,249,661 B2* | 8/2012 | Lee et al. | 455/566 |
| 8,254,928 B2* | 8/2012 | Watanabe et al. | 455/436 |
| 8,498,267 B2* | 7/2013 | Choi-Grogan et al. | 370/331 |
| 2008/0057865 A1 | 3/2008 | Bennett | |
| 2010/0248640 A1* | 9/2010 | MacNaughtan et al. | 455/67.11 |
| 2010/0291907 A1* | 11/2010 | MacNaughtan et al. | 455/414.1 |

FOREIGN PATENT DOCUMENTS

| | | |
|---|---|---|
| CN | 101346638 | 1/2009 |
| EP | 2023679 A2 | 2/2009 |
| JP | 2004-320473 | 11/2004 |
| JP | 2005-244533 | 9/2005 |
| JP | 2006-135929 | 5/2006 |
| JP | 2007-082106 | 3/2007 |
| JP | 2008-278313 | 11/2008 |
| KR | 10-2006-0028997 | 4/2006 |
| KR | 10-0600405 B1 | 7/2006 |
| KR | 10-0623381 B1 | 9/2006 |

OTHER PUBLICATIONS

Written Opinion of International Searching Authority dated Sep. 23, 2011 in connection with PCT Patent Application No. PCT/KR2011/000210.

Japanese Office Action dated Aug. 20, 2013 in connection with Japanese Patent Application No. 2012-548883, 5 pages.

Chinese Office Action dated Apr. 30, 2014 in connection with Chinese Patent Application No. 201180005810.0, 18 pages.

* cited by examiner

METHOD AND APPARATUS FOR AUTOMATICALLY CONNECTING SHORT RANGE WIRELESS NETWORK IN PORTABLE TERMINAL

CROSS-REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Jan. 12, 2010, and assigned Serial No. 10-2010-0002561, the entire disclosure of which is hereby incorporated by reference.

TECHNICAL FIELD OF THE INVENTION

The present invention relates generally to a portable terminal for supporting a short range wireless network. More particularly, the present invention relates to a method and an apparatus for automatically connecting a short range wireless network without user's manipulation.

BACKGROUND OF THE INVENTION

Recently, as attention on home networks is rapidly increasing, portable terminals allowing use of a cellular network and a short range wireless network are under development. Examples of the short range wireless communication technology include a wireless Local Area Network (LAN) and a wireless Personal Area Network (PAN).

Primarily, the portable terminal supporting the cellular network and the short range wireless network can use the same service as the service provided from the cellular network by registering itself to an Access Point (AP) of the short range wireless network.

When a communication module for supporting the short range wireless network is turned on, a conventional portable terminal receives beacon signals from neighbor APs until discovering the AP corresponding to a Service Set ID (SSID) to connect, connects to the corresponding AP when the AP to connect is found, and thus receives the service. That is, when the corresponding AP is not found while the communication module for supporting the short range wireless network is turned on, the portable terminal continues to searching for the corresponding AP. Such operations waste the power of the portable terminal when there is no corresponding AP. Thus, the conventional portable terminal allows the user to turn on and off the communication module which supports the short range wireless network if the AP access is necessary.

However, the user's direct manipulation causes the user inconvenience. In addition, when the user does not turn on and off the short range communication module, the necessary service is unusable or the power is wasted.

SUMMARY OF THE INVENTION

To address the above-discussed deficiencies of the prior art, it is a primary aspect of the present invention to provide a method and an apparatus for automatically connecting a short range wireless network without user's manipulation in a portable terminal.

Another aspect of the present invention is to provide a method and an apparatus for controlling the turning on and off of a short range wireless network support module using location information in a portable terminal.

Yet another aspect of the present invention is to provide a method and an apparatus for controlling the turning on and off of a short range wireless network support module using motion information in a portable terminal.

Still another aspect of the present invention is to provide a method and an apparatus for controlling a short range wireless network search cycle using location information in a portable terminal.

A further aspect of the present invention is to provide a method and an apparatus for controlling a short range wireless network search cycle using motion information in a portable terminal.

A further aspect of the present invention is to provide a method and an apparatus for executing a preset event by automatically connecting a short range wireless network in a portable terminal.

According to one aspect of the present invention, a method for automatically connecting a short range wireless network in a portable terminal includes, when registering to an Access Point (AP), storing location information of the AP. The method also includes obtaining location information of the terminal. The method further includes controlling an activation cycle of a communication module by comparing the location information of the terminal and the location information of the AP. The method still further includes, when the communication module is activated, searching for the AP.

According to another aspect of the present invention, an apparatus for automatically connecting a short range wireless network in a portable terminal includes a storage configured, in an AP registration, to store location information of the AP. The apparatus also includes a location information acquisition module configured to obtain location information of the terminal. The apparatus further includes a controller configured to control an activation cycle of a communication module by comparing the location information of the terminal and the location information of the AP. The communication module is activated to search for the AP.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

Embodiments of the present invention provide a technique for controlling power on/off of a short range wireless network support module and an Access Point (AP) search cycle using location information and motion information in a portable terminal. Hereinafter, the short range wireless network employs a Wireless Local Area Network (WLAN) by way of example. The present invention is equally applicable to a Wireless Personal Area Network (WPAN).

Figure 1A:
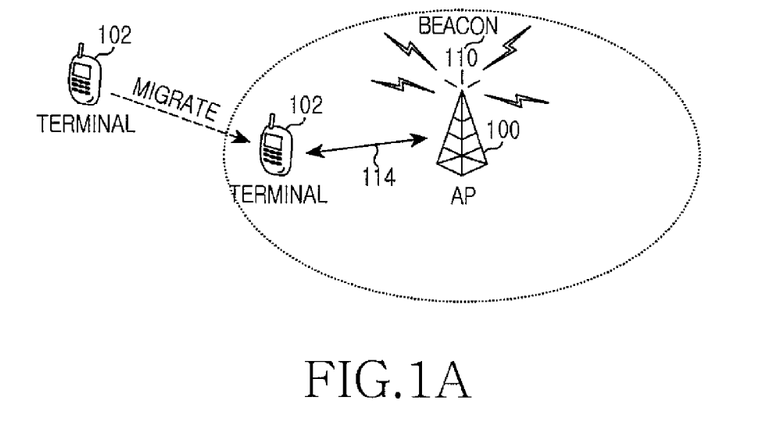
FIGS. 1A and 1B illustrate an AP search cycle of a portable terminal according to an embodiment of the present invention.
Figure 1B:
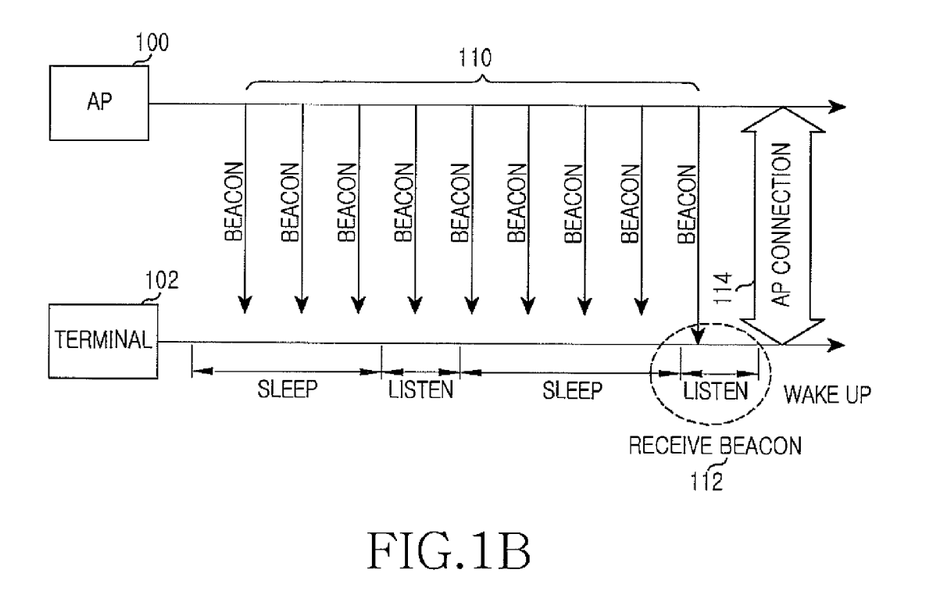

FIGS. 1A and 1B illustrate an AP search cycle of a portable terminal according to an embodiment of the present invention.

Referring to FIGS. 1A and 1B, the AP 100 of the short range wireless network periodically transmits a beacon signal in step 110.

A terminal 102 periodically determines the power on/off of a WLAN module and an AP search cycle using location information or motion information, and checks whether it travels around its registered AP 100. When the terminal 102 is around the AP 100, it turns on the WLAN and periodically repeats a sleep mode and a listen mode according to a predetermined AP search cycle. Herein, the AP search cycle indicates a time interval of maintaining or switching the sleep mode and the listen mode, the sleep mode indicates the signal transmission and reception infeasible mode as the short range wireless network support module (hereafter, referred to as a WLAN module) uses the power below a certain level, and the listen mode indicates the signal transmission and reception feasible mode as the WLAN module uses the power over the certain level.

Next, when the terminal 102 enters a service coverage of the AP 100, it receives a beacon signal of the AP 100 in the listen mode in step 112 and performs a connection procedure with the AP 100 in step 114. After searching for a preset event based on the WLAN, the terminal 102 can automatically execute a function corresponding to the searched event.

Figure 2A:
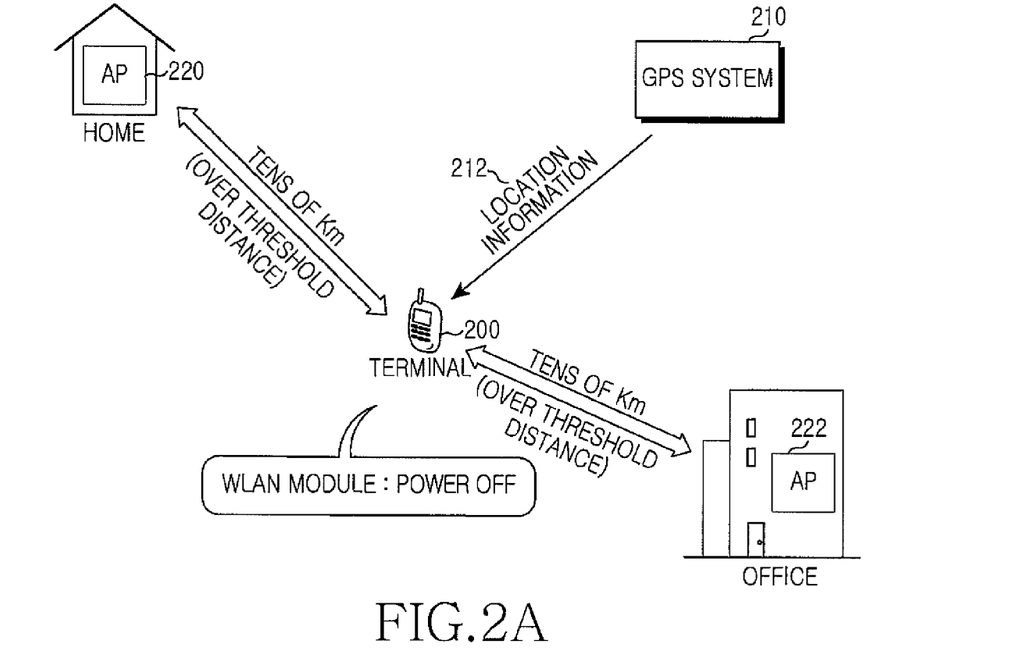
FIGS. 2A and 2B illustrate an AP search according to a location in the portable terminal according to an embodiment of the present invention.
Figure 2B:
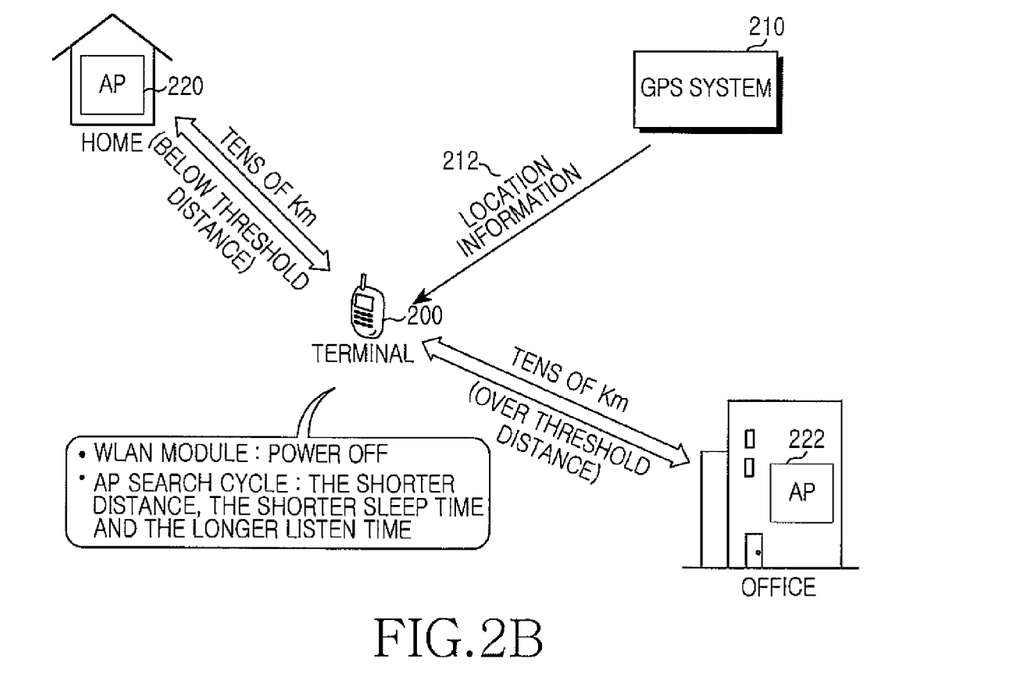

FIGS. 2A and 2B illustrate an AP search according to the location in the portable terminal according to an embodiment of the present invention.

As shown in FIGS. 2A and 2B, a terminal 200 measures distances to pre-registered APs 220 and 222 by obtaining its location information 212 from a Global Positioning system (GPS) system 210, and can determine the power on/off of the WLAN module and the AP search cycle according to the measured distances.

When the distances to the pre-registered APs 220 and 222 exceed a threshold distance as shown in FIG. 2A, the terminal 200 turns off the WLAN module.

When at least one of the distances to the pre-registered APs 220 and 222 falls below the threshold distance as shown in FIG. 2B, the terminal 200 turns on the WLAN module and searches for the AP by determining the AP search cycle. In so doing, as the measured distance to the AP 220 is shorter, the terminal 200 shortens the sleep mode time and lengthens the listen mode time. Conversely, as the measured distance to the AP 220 is longer, the terminal 200 can lengthen the sleep mode time and shorten the listen mode time. Notably, the listen mode time can be set to the multiple of a beacon transmission period so as not to miss the beacon of the AP.

In the listen mode, the terminal 200 can attempt to scan an address or an ID of the AP determined to reside within the threshold distance among the APs 220 and 222.

Also, when the distance to the AP 220 falls below the threshold distance, the terminal 200 may determine the power on/off of the WLAN module and the AP search cycle by considering motion. For example, even when the distance to the AP 220 is shorter than the threshold distance, the terminal 200 can turn off the WLAN module or operate in the sleep mode not so as to scan the beacon while the terminal 200 does not move.

Now, structure and operations of the portable terminal are described by referring to FIGS. 3 through 7.

Figure 3:
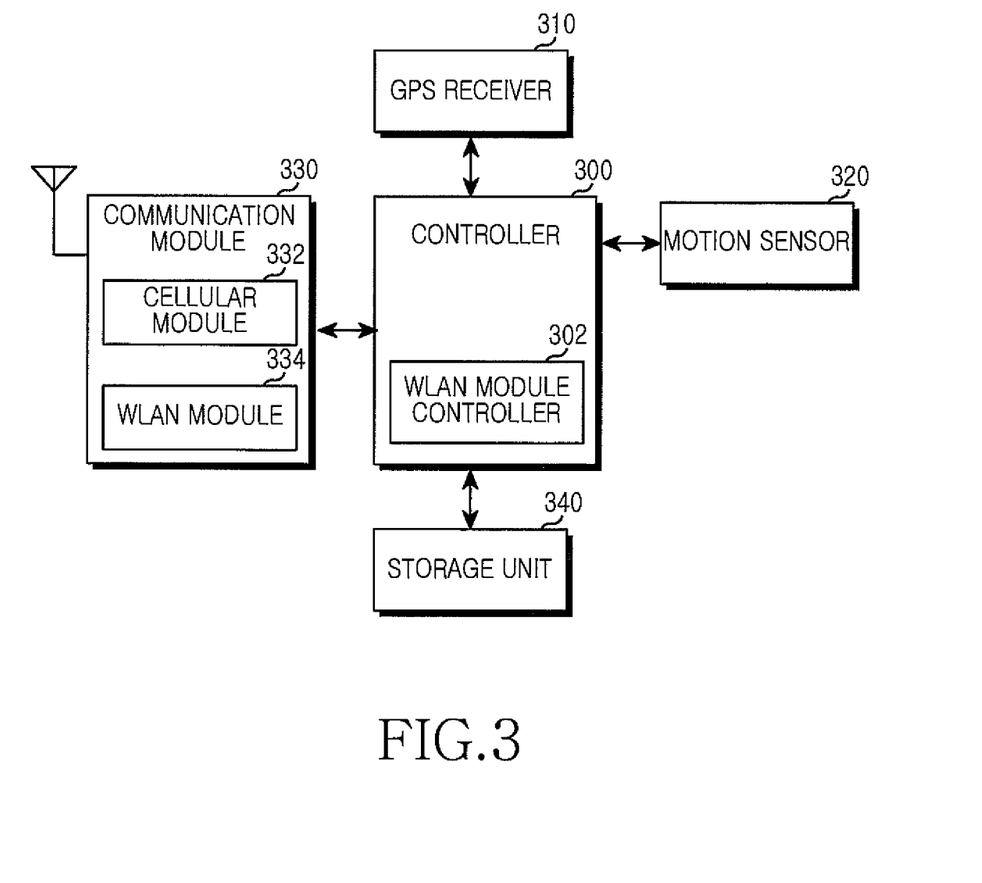
FIG. 3 illustrates the portable terminal according to an embodiment of the present invention.

FIG. 3 is a block diagram of the portable terminal according to an embodiment of the present invention.

Referring to FIG. 3, the portable terminal includes a controller 300, a GPS receiver 310, a motion sensor 320, a communication module 330, and a storage unit 340. The controller 300 includes a WLAN controller 302, and the communication module 330 includes a cellular module 332 and a WLAN module 334.

The controller 300 controls and processes operations of the portable terminal. In embodiments of the present invention, the controller 300 includes the WLAN module controller 302 for controlling and processing to automatically connect to the WLAN using the location information and the motion information.

In the AP initial registration, the WLAN module controller 302 stores a Media Access Control (MAC) address of the AP to the storage unit 340, determines the location information of the initial registration as location information of the AP, and stores the location information to the storage unit 340.

The WLAN module controller 302 periodically acquires current location information from the GPS receiver 310, measures the distance between the terminal and the pre-registered AP using the current location information and the location information of the AP, and determines the power on/off of the WLAN module and the AP search cycle according to the measured distance. When the measured distance between the terminal and the AP exceeds the threshold distance, the WLAN module controller 302 can determine to turn off the WLAN module 334. When the distance is below the threshold distance, the WLAN module controller 302 can determine to turn on the WLAN module 334. When the measured distance between the terminal and the AP falls below the threshold distance and the measured distance gets shorter, the WLAN module controller 302 can shorten the sleep interval and lengthen the listen interval of the WLAN module 334. Conversely, as the measured distance gets longer, the WLAN module controller 302 can lengthen the sleep interval and shorten the listen interval of the WLAN module 334.

According to the motion information of the terminal obtained from the motion sensor 320, the WLAN module controller 302 determines the power on/off of the WLAN module 334 and the AP search cycle. More specifically, when the terminal does not move at all, the WLAN module controller 302 can determine to turn off the WLAN module 334 or to stay in the sleep mode. For example, when the terminal is stationary like a terminal on a desk, the WLAN module controller 302 can turn off the WLAN module 334 or stay in the sleep mode because there is no need to periodically search for the AP. When the terminal is moving, the WLAN module controller 302 determines to turn on the WLAN module 334. In so doing, when the motion degree of the terminal exceeds a threshold, the WLAN module controller 302 can shorten the sleep interval and lengthen the listen interval. Conversely, when the motion degree of the terminal falls below the threshold, the WLAN module controller 302 can lengthen the sleep interval and shorten the listen interval of the WLAN module 334.

Depending on the setting of a provider or a user, the WLAN module controller 302 may determine the power on/off of the WLAN module and the AP search cycle by considering both or only one of the location information and the motion information.

According to the location information or the motion information of the terminal, the WLAN module controller 302 can change the cycle of obtaining the location information or the motion information.

The GPS receiver 310 receives a signal from a GPS satellite and obtains location coordinates indicating the location of the portable terminal. The GPS receiver 310 obtains the location information by periods under the control of the controller 300 and provides the obtained location information to the controller 300.

The motion sensor 320 detects the inertial force of the terminal and provides motion information such as acceleration, travel speed, travel direction, and travel distance. Herein, the motion sensor 320 includes an inertial sensor, for example, an accelerometer and a gyroscope.

The communication module 330 includes the cellular module 332 and the WLAN module 334 for processing signals transmitted to and received from a cellular network and a WLAN network. More specifically, the communication module 330 scans the beacon signal from the AP of the WLAN network through the WLAN module 334 under the control of the controller 300. Under the control of the controller 300, the WLAN module 334 is activated or deactivated when it is turned on or off. When the WLAN module 334 is turned on, it switches between the sleep mode and the listen mode according to the AP search cycle and functions to scan the beacon signal of the pre-registered AP. Herein, when the WLAN module 334 is being turned on, the cellular module 332 operates in the sleep mode.

The storage unit 340 stores programs and data for the operations of the portable terminal. In embodiments of the present invention, the storage unit 340 stores the MAC address and the location information of the AP. The storage unit 340 can store a table of the AP search cycle based on the location information or the motion information.

Figure 4:
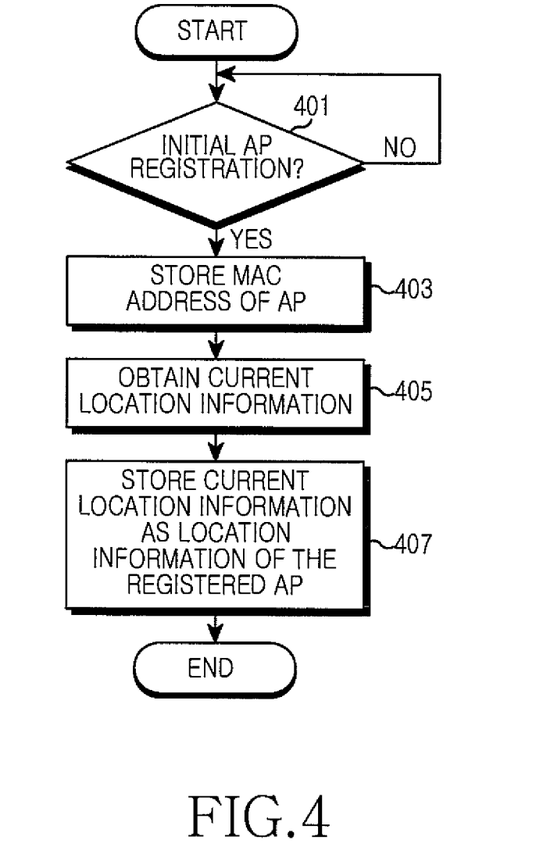
FIG. 4 illustrates an initial AP registration method in the portable terminal according to an embodiment of the present invention.

FIG. 4 illustrates an initial AP registration method in the portable terminal according to an embodiment of the present invention.

In step 401, the terminal checks whether the initial registration procedure is conducted. When the initial registration procedure is conducted, the terminal obtains and stores the MAC address from the AP in step 403 and obtains the current location information in step 405.

The terminal determines the obtained current location information as the location information of the AP and stores the location information in step 407, and then finishes this process.

Figure 5:
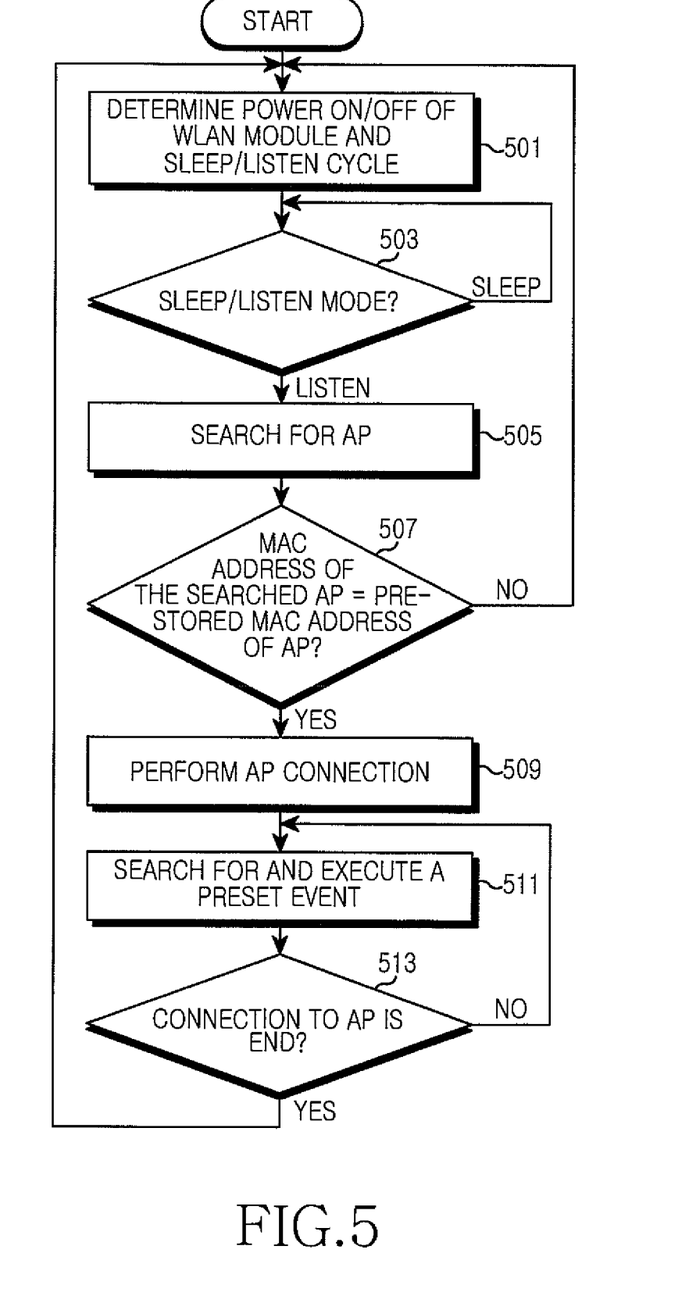
FIG. 5 illustrates an AP search method in the portable terminal according to an embodiment of the present invention.

FIG. 5 illustrates an AP search method in the portable terminal according to an embodiment of the present invention.

In step 501, the terminal determines the power on/off of the WLAN module and the AP search cycle indicating the sleep and listen intervals using the location information or the motion information. Herein, the determination of the power on/off of the WLAN module and the AP search cycle using the location information or the motion information shall be elucidated by referring to FIGS. 6 and 7.

In step 503, the terminal examines whether the WLAN module enters the listen mode during its operation according to the determined power on/off of the WLAN module and the AP search cycle.

When the WLAN module enters the listen mode, the terminal searches for the AP by scanning the beacon sent from neighbor APs in step 505, and compares the MAC address of the searched AP with the pre-stored MAC address of the AP in step 507. When the MAC address of the searched AP is different from the pre-stored MAC address of the AP, the terminal determines that the connection to the searched AP may not be possible and then returns to step 501.

When the MAC address of the searched AP and the pre-stored MAC address of the AP are identical, the terminal performs the connection to the searched AP in step 509.

Next, the terminal searches for and executes the preset event in step 511 and checks whether the connection to the AP ends in step 513. When the connection to the AP does not end, the terminal goes back to step 511. Herein, the communication is carried out via the AP.

By contrast, when the connection to the AP ends, the terminal goes back to step 501. Herein, the AP connection end embraces both of the connection end according to the user's manipulation and the automatic connection end because of the long distance from the AP.

Figure 6:
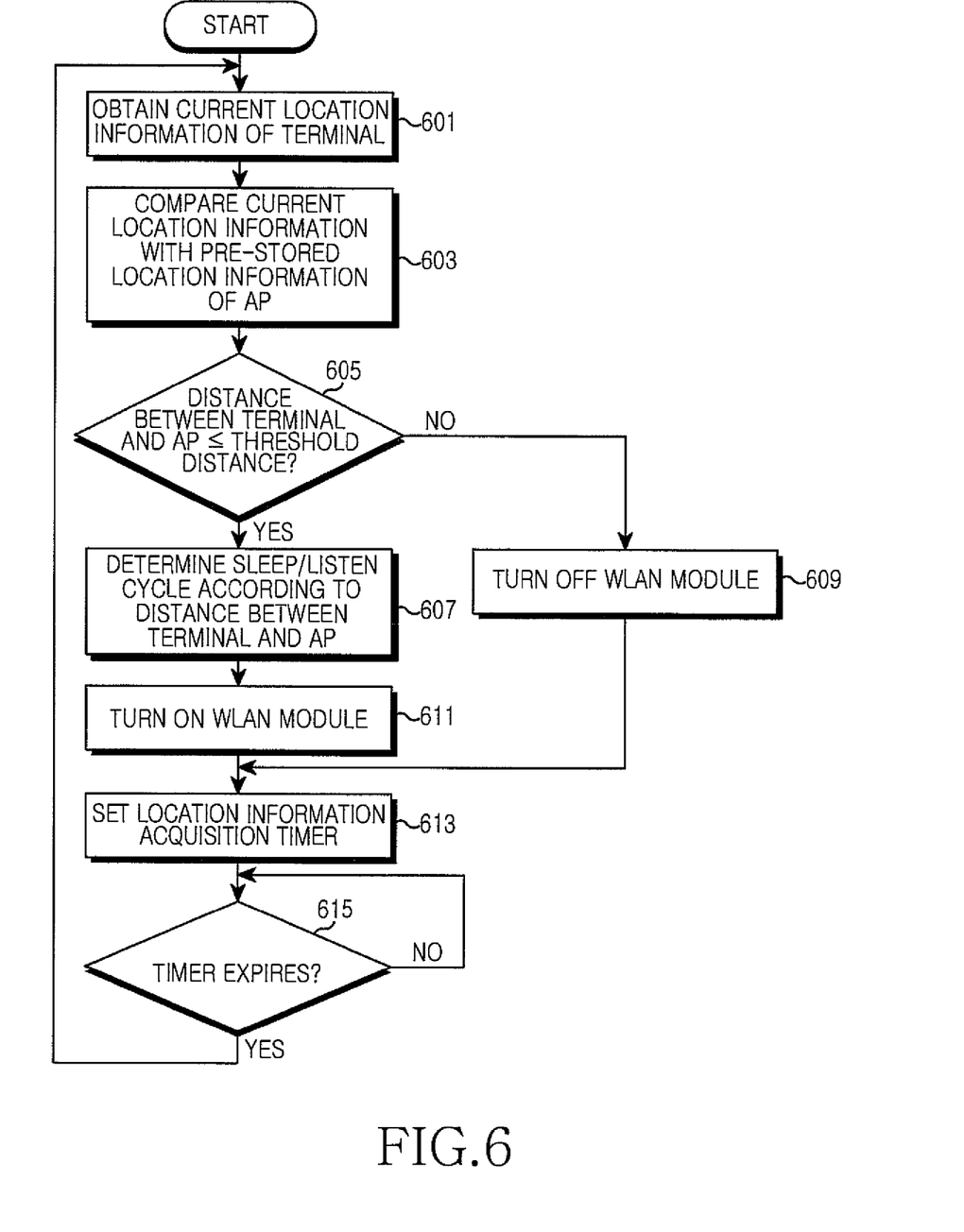
FIG. 6 illustrates a method for controlling the power on/off of the short range wireless network support module and the AP search cycle using location information in the portable terminal according to an embodiment of the present invention.

FIG. 6 illustrates a method for controlling the power on/off of the short range wireless network support module and the AP search cycle using the location information in the portable terminal according to an embodiment of the present invention.

The terminal obtains its current location information in step 601 and compares the current location information with the pre-stored location information of the AP in step 603. In step 605, the terminal checks whether the distance between the terminal and the AP is shorter than or equal to the threshold distance according to the comparison result.

When the distance between the terminal and the AP is shorter than or equal to the threshold distance, the terminal determines the AP search interval indicating the sleep/listen interval according to the distance between the terminal and the AP in step 607, determines to turn on the WLAN module in step 611, and then goes to step 613. For example, when the distance between the terminal and the AP gets shorter, the terminal determines to shorten the sleep interval and lengthen the listen interval of the WLAN module. Conversely, when the distance between the terminal and the AP gets longer, the terminal determines to lengthen the sleep interval and shorten the listen interval of the WLAN module.

When the distance between the terminal and the AP is greater than the threshold distance, the terminal determines to turn off the WLAN module in step 609 and proceeds to step 613.

In step 613, the terminal sets a location information acquisition timer according to the distance between the terminal and the AP. For example, as the distance between the terminal and the AP increases, the terminal extends the location information acquisition timer. As the distance between the terminal and the AP decreases, the terminal reduces the location information acquisition timer.

In step 615, the terminal operates the set location information acquisition timer and examines whether the location information acquisition timer expires. When the timer expires, the terminal returns to step 601.

Figure 7:
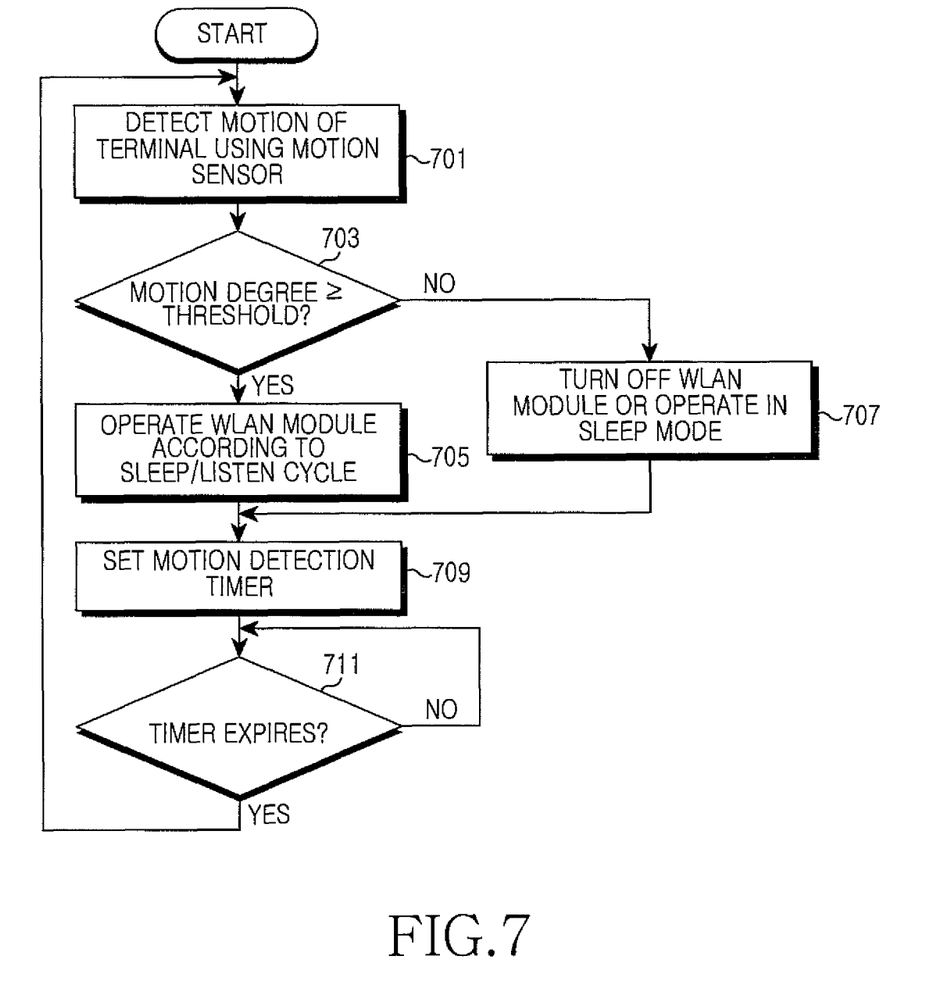
FIG. 7 illustrates a method for controlling the power on/off of the short range wireless network support module and the AP search cycle using motion information in the portable terminal according to an embodiment of the present invention.

FIG. 7 illustrates a method for controlling the power on/off of the short range wireless network support module and the AP search cycle using the motion information in the portable terminal according to an embodiment of the present invention.

The terminal detects its motion using the motion sensor in step 701 and determines whether its motion degree is greater than or equal to the threshold in step 703.

When the motion degree of the terminal is greater than or equal to the threshold, the terminal determines to turn on the WLAN module and the AP search cycle in step 705, and then goes to step 709. In so doing, as the motion degree of the terminal is greater, the terminal can shorten the sleep interval and lengthen the listen interval. Conversely, as the motion degree of the terminal is smaller, the terminal can lengthen the sleep interval and shorten the listen interval.

When the motion degree of the terminal is smaller than the threshold, the terminal determines to turn off the WLAN module or to stay in the sleep mode in step 707, and then goes to step 709. When the terminal is stationary like a terminal sitting on a desk, there is no need to periodically search for the AP.

In step 709, the terminal sets a motion detection timer according to its motion degree. For example, when the terminal is moving, it can shorten the motion detection timer. When the terminal is not moving, it can lengthen the motion detection timer.

In step 711, the terminal operates the set motion detection timer and checks whether the motion detection timer expires. When the timer expires, the terminal returns to 701.

So far, while the terminal obtains the location information from the GPS system and determines the distance to the AP, the terminal may determine the power on/off of the WLAN module and the AP search cycle by obtaining a cell ID from a base station of the cellular network and determining the distance to the AP or by determining whether it is accessible to the AP. For example, when the cell ID corresponding to the pre-registered AP is A, B and the cell ID of A or B is obtained from the base station of the cell network, the terminal can determine that it is accessible to the AP, turns on the WLAN module, and set the AP search cycle.

The location acquisition timer for obtaining the location information of the terminal by periods can be reset according to the motion degree measured by the motion sensor. For example, when the terminal is stationary or moving slowly, the location acquisition timer can be lengthened. Conversely, the motion detection timer can be reset according to the location information. For example, when the distance between the terminal and the AP exceeds the threshold distance, the motion detection timer can be lengthened. Thus, the terminal can save the power consumed to turn on and off the GPS receiver or the motion sensor.

While the power on/off of the WLAN module and the AP search cycle are determined using the location information and the motion information of the terminal, the remaining voltage of the terminal may be considered when the power on/off of the WLAN module and the AP search cycle are determined.

As set forth above, since the terminal is automatically connected to the WLAN, the terminal can provide various services by conducting the preset event based on the WLAN. For example, when the user is near his/her home or office, the terminal can transmit to peripherals and back up records, such as SMS, photo, phone record, and GPS travel path of the terminal, automatically collect RSS, and automatically transmit to VoIP by automatically connecting to the WLAN. Herein, the RSS indicates contents used in news or blog sites. When the user is near the home or the office, the terminal automatically connects to the WLAN and thus makes electronic devices (e.g., furnace, air conditioner, electric lamp, computer, and TV) in the home or the office conduct a preset operation (e.g., turn on). When the user is far away from the home or the office, the terminal may be disconnected from the WLAN and the electronic devices (e.g., furnace, air conditioner, electric lamp, computer, and TV) may perform a preset operation (e.g., turn off).

By virtue of the WLAN automatic connection function, a messenger on the computer or the TV around the terminal can automatically log on or receive a phone call, and the computer or the TV can inform of the incoming phone call to the terminal, a message received, or the battery status of the terminal. When the terminal is automatically connected to the WLAN, the user may sound an alarm of a remote controller corresponding to the electronic device through the terminal and thus easily find the remote controller, and allow an Internet financial settlement when the terminal is in the vicinity to thus strengthen security.

Since the portable terminal controls the power on/off of the short range wireless network support module and the AP search cycle using the location information and the motion information, the terminal does not search for the WLAN when it is far away from the registered AP and automatically connects to the WLAN when it is around the registered AP. Therefore, the user does not have to turn on and off the WLAN module in person and can feel as if he/she accesses the AP all the time.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method for automatically connecting a short range wireless network in a portable terminal, the method comprising:
   after registering to an Access Point (AP), storing location information of the AP in the terminal;
   obtaining location information of the terminal;
   controlling an activation cycle of a communication module of the terminal by comparing the location information of the terminal and the location information of the AP; and
   after the communication module is activated, searching for the AP, wherein the controlling of the activation cycle of the communication module comprises:
  comparing a distance between the terminal and the AP with a threshold distance,
  when the distance between the terminal and the AP is greater than the threshold distance, deactivating the communication module, and
  when the distance between the terminal and the AP is smaller than or equal to the threshold distance, activating the communication module.

2. The method of claim 1, further comprising:
measuring a motion of the terminal; and
controlling the activation cycle of the communication module according to the motion of the terminal.

3. The method of claim 2, wherein the controlling of the activation cycle of the communication module according to the motion of the terminal comprises:
  comparing the motion degree of the terminal with a threshold;
  when the motion degree of the terminal is less than or equal to the threshold, deactivating the communication module; and
  when the motion degree of the terminal is greater than the threshold, activating the communication module.

4. The method of claim 2, further comprising:
controlling at least one of a cycle for obtaining the location information of the terminal and a cycle for measuring the motion of the terminal using at least one of the distance between the terminal and the AP and the motion of the terminal.

5. The method of claim 1, further comprising:
controlling a scan cycle of the communication module according to the distance between the terminal and the AP,
wherein, as the distance between the terminal and the AP becomes shorter, the scan cycle lengthens a scan interval and shortens a non scan interval.

6. The method of claim 1, further comprising:
measuring a motion of the terminal; and
controlling a scan cycle of the communication module according to the motion of the terminal.

7. The method of claim 6, wherein the controlling of the scan cycle of the communication module according to the motion degree of the terminal comprises:
  as the motion degree of the terminal becomes smaller, shortening the scan interval and lengthening the non scan interval.

8. The method of claim 7, wherein the scan interval includes multiples of a beacon transmission period of the AP.

9. The method of claim 1, wherein the location information is any one of location coordinates and a cell identifier.

10. The method of claim 1, further comprising:
after discovering the registered AP, performing a connection procedure with the searched AP; and
executing a pre-registered event corresponding to the AP.

11. An apparatus for automatically connecting a short range wireless network in a portable terminal, the apparatus comprising:
  a storage configured, in an Access Point (AP) registration, to store location information of the AP;
  a location information acquisition module configured to obtain location information of the terminal;
  a controller configured to control an activation cycle of a communication module by comparing the location information of the terminal and the location information of the AP; and
  the communication module configured to activate in order to search for the AP,
  wherein the controller is configured to compare a distance between the terminal and the AP with a threshold distance, deactivate the communication module when the distance between the terminal and the AP is greater than the threshold distance, and activate the communication module when the distance between the terminal and the AP is smaller than or equal to the threshold distance.

12. The apparatus of claim 11, further comprising:
an inertial sensor configured to measure a motion of the terminal,
wherein the controller is configured to control the activation cycle of the communication module according to the motion of the terminal.

13. The apparatus of claim 12, wherein the controller is configured to compare the motion degree of the terminal with a threshold, deactivate the communication module when the motion degree of the terminal is less than or equal to the threshold, and activate the communication module when the motion degree of the terminal is greater than the threshold.

14. The apparatus of claim 12, wherein the controller is configured to control at least one of a location information acquisition cycle of the location information acquisition module and a motion measurement cycle of the inertial sensor using at least one of the distance between the terminal and the AP and the motion of the terminal.

15. The apparatus of claim 12, wherein the location information is any one of location coordinates and a cell identifier.

16. The apparatus of claim 11, wherein the controller is configured to control a scan cycle of the communication module according to the distance between the terminal and the AP, and lengthen a scan interval and shorten a non scan interval as the distance between the terminal and the AP is shorter.

17. The apparatus of claim 11, further comprising:
an inertial sensor configured to measure a motion of the terminal,
wherein the controller is configured to control a scan cycle of the communication module according to the motion of the terminal.

18. The apparatus of claim 17, wherein, as the motion degree of the terminal becomes smaller, the controller is configured to shorten the scan interval and lengthen the non scan interval.

19. The apparatus of claim 18, wherein the scan interval includes multiples of a beacon transmission period of the AP.

20. The apparatus of claim 11, wherein, after the registered AP is found, the communication module is configured to perform a connection procedure with the searched AP, and
  the controller is configured to execute a pre-registered event corresponding to the AP.

* * * * *